(12) United States Patent
Schroeder

(10) Patent No.: US 11,803,194 B2
(45) Date of Patent: *Oct. 31, 2023

(54) MONOLITHIC ATTITUDE CONTROL MOTOR FRAME AND SYSTEM

(71) Applicant: LOCKHEED MARTIN CORPORATION, Bethesda, MD (US)

(72) Inventor: Wayne K. Schroeder, Colleyville, TX (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/963,632

(22) Filed: Oct. 11, 2022

(65) Prior Publication Data
US 2023/0044244 A1 Feb. 9, 2023

Related U.S. Application Data

(63) Continuation of application No. 15/564,942, filed as application No. PCT/US2011/021229 on Jan. 14, 2011, now Pat. No. 11,543,835.
(Continued)

(51) Int. Cl.
*F42B 10/66* (2006.01)
*G05D 1/08* (2006.01)
(Continued)

(52) U.S. Cl.
CPC .............. *G05D 1/08* (2013.01); *B63G 8/16* (2013.01); *B63H 25/46* (2013.01); *B64C 15/00* (2013.01);
(Continued)

(58) Field of Classification Search
CPC . G05D 1/08; B63G 8/16; B63H 25/46; B64C 15/00; B64G 1/26; F42B 10/661; F42B 19/01
See application file for complete search history.

(56) References Cited

U.S. PATENT DOCUMENTS 3,028,807 A 4/1962 Burton
3,034,434 A 5/1962 Swaim
(Continued)

OTHER PUBLICATIONS

International Search Report, dated Mar. 17, 2011.
(Continued)

*Primary Examiner* — Lorne E Meade
(74) *Attorney, Agent, or Firm* — Terry M. Sanks, Esq.; Beusse Sanks, PLLC

(57) ABSTRACT

A monolithic attitude control motor frame includes a monolithic structure including an outer surface of revolution and a plurality of side walls defining a plurality of cavities extending from the outer surface of revolution. Adjacent cavities of the plurality of cavities share a side wall or side wall portion therebetween. Each of the cavities is configured to receive an attitude control motor. A monolithic attitude control motor system includes a monolithic frame including an outer surface of revolution and a plurality of side walls defining a plurality of cavities extending radially from the outer surface of revolution. The system further includes a plurality of attitude control motors corresponding to the plurality of cavities, such that an attitude control motor of the plurality of attitude motors is disposed in each cavity of the plurality of cavities.

17 Claims, 5 Drawing Sheets

Related U.S. Application Data

(60) Provisional application No. 61/295,496, filed on Jan. 15, 2010.

(51) Int. Cl.
*B63G 8/16* (2006.01)
*B63H 25/46* (2006.01)
*B64C 15/00* (2006.01)
*B64G 1/26* (2006.01)
*F42B 19/01* (2006.01)

(52) U.S. Cl.
CPC .............. *B64G 1/26* (2013.01); *F42B 10/661* (2013.01); *F42B 19/01* (2013.01); *G05D 1/0858* (2013.01)

(56) References Cited

U.S. PATENT DOCUMENTS

| | | |
|---|---|---|
| 3,316,719 A | 5/1967 | Loprete |
| 3,374,967 A | 3/1968 | Plumley |
| 4,408,735 A | 10/1983 | Metz |
| 4,444,119 A | 4/1984 | Caponi |
| 4,581,998 A | 4/1986 | Horst, Jr |
| 4,641,801 A | 2/1987 | Lynch, Jr. |
| 5,028,014 A | 7/1991 | Anderson, Jr. |
| 5,044,156 A | 9/1991 | Deffayet |
| 5,054,712 A | 10/1991 | Bar |
| 5,433,399 A | 7/1995 | Becker |
| 5,657,948 A | 8/1997 | Roucoux |
| 6,178,741 B1 | 1/2001 | Nelson |
| 6,315,238 B1 | 11/2001 | Kirschner, Jr. |
| 6,322,023 B1 | 11/2001 | Soranno et al. |
| 6,367,735 B1 | 4/2002 | Folsom |
| 6,565,036 B1 | 5/2003 | Palathingal |
| 6,752,351 B2 | 6/2004 | John |
| 7,000,377 B1 | 2/2006 | Knight |
| 7,004,423 B2 | 2/2006 | Folsom |
| 7,281,367 B2 | 10/2007 | Rohrbaugh et al. |
| 7,610,747 B2 | 11/2009 | Kim |
| 7,800,031 B2 | 9/2010 | Rastegar |
| 8,084,725 B1 | 12/2011 | Dryer |
| 9,151,581 B2 | 10/2015 | Rastegar |
| 11,543,835 B2 * | 1/2023 | Schroeder ............ F42B 10/661 |
| 2008/0188150 A1 | 8/2008 | Hine et al. |
| 2010/0206195 A1 | 8/2010 | Rastegar |
| 2011/0204177 A1 | 8/2011 | Ritchie |
| 2011/0309186 A1 | 12/2011 | Dryer |

OTHER PUBLICATIONS

Kyle Mizokami, "The Navy has shot down an Intercontinental Ballistic Missile for the first time", Popular Mechanics, Nov. 17, 2020 [www.popularmechanics.com/military/weapons/a34702702/navy-destroyer-shoots-down-icbm-watch-historic-test/accessed on Dec. 14, 2020] (Year: 2020).

Max Fisher, et al., "Did American Missile Defense Fail in Saudi Arabia?", New York Times Company, Dec. 4, 2017 )Year: 2017).

Truncated square tiling webpage [en.wikipedia.org/wiki/Truncated_square_tiling accessed on Nov. 21, 2019] (Year: 2019).

Hexagonal tiling webpage [en.wikipedia.org/Hexagonal_tiling accessed on Nov. 21, 2019] (Year: 2019).

* cited by examiner

MONOLITHIC ATTITUDE CONTROL MOTOR FRAME AND SYSTEM

TECHNICAL FIELD

The present invention relates in general o the field of vehicle attitude control.

DESCRIPTION OF PRIOR ART

Many modern vehicles require thruster control during certain phases of flight. Conventionally, such vehicles utilize solid gas generators or attitude control motors to achieve thruster control. These control devices can be placed on the fore or aft ends for control moment applications or generally in the center of the body for direct force control. Generally, solid gas generators use a larger grain volume and a valve system to direct the thrust in the desired direction. While these systems are able to package more impulse in a given volume, the mass flow must remain fairly constant so that venting is required to prevent overpressurization, which wastes much of the desired packaged propellant. Systems employing solid gas generators are also expensive due to the valve and actuation systems required. Jet interaction is fan shaped in such systems and is, therefore, more complicated. Conventional attitude control motor systems employ banks of individual, self-contained attitude control motors that are fired in the desired direction to achieve forward thruster control. Conventional attitude control motors are generally circular in cross-section to efficiently contain pressurization forces when the motor is operated. Such conventional motors, however, are bulky, self-contained pressure vessels when compared to their thrust output; that is, the motors require a significant volume of the vehicle when compared to their thrust output. Some vehicles, therefore, cannot employ conventional attitude control motors, as insufficient volume exists in the vehicle.

While there are attitude control motor systems well known in the art, considerable room for improvement remains.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
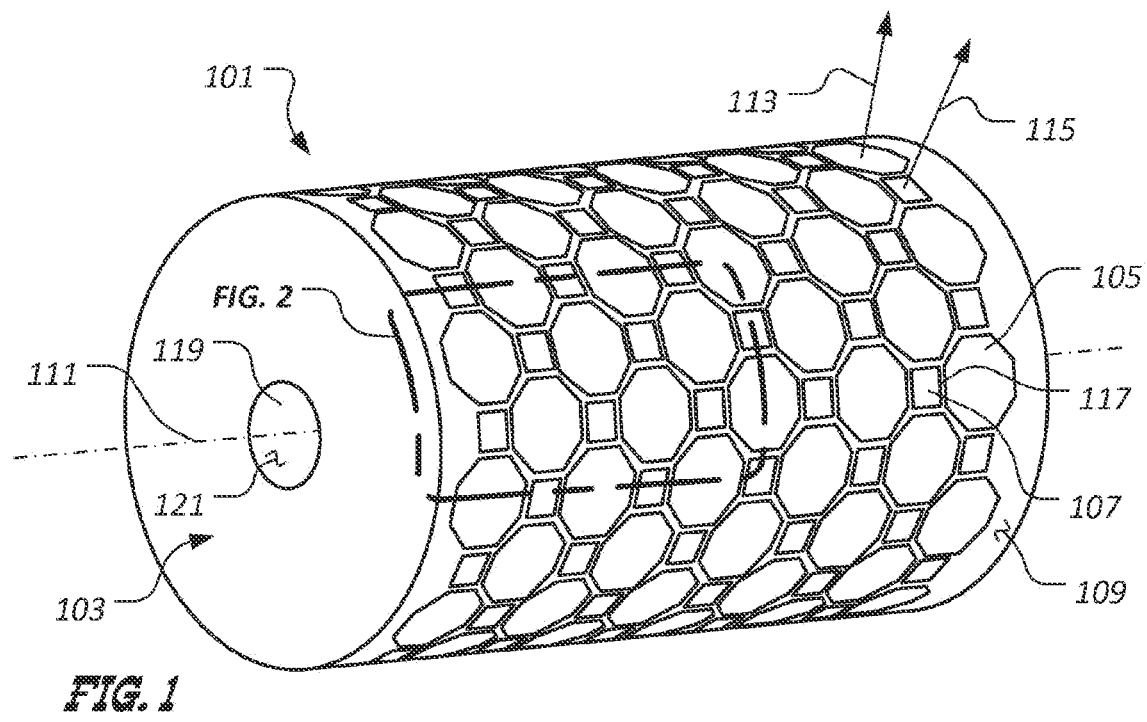
FIG. 1 is a perspective view of a first illustrative embodiment of a monolithic attitude control motor system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention concerns a monolithic structure that utilizes shared pressure vessel walls of adjacent attitude control motors to distribute the operational pressure loads throughout the structure, thus allowing less structure as compared with self-contained pressure vessels.

The present invention relates to a monolithic attitude control motor frame that includes a monolithic structure comprising an outer surface of revolution and a plurality of side walls defining a plurality of cavities extending radially from the outer surface of revolution. Adjacent cavities of the plurality of cavities share a side wall or side wall portion therebetween. Each of the cavities is configured to receive an attitude control motor.

The present invention further relates to a monolithic attitude control motor system that includes a monolithic frame comprising an outer surface of revolution and a plurality of side walls defining a plurality of cavities extending radially from the outer surface of revolution. The system further includes a plurality of attitude control motors corresponding to the plurality of cavities, such that an attitude control motor of the plurality of attitude control motors is disposed in each cavity of the plurality of cavities. Adjacent attitude control motors share a side wall or a portion of a side wall therebetween and wherein pressurization loads generated by operation of one of the plurality of attitude control motors are transmitted to the monolithic frame.

The present invention also relates to a vehicle that includes a body and a monolithic attitude control system operably associated with the body. The monolithic attitude control system includes a monolithic frame comprising an outer surface of revolution and a plurality of side walls defining a plurality of cavities extending radially from the outer surface of revolution. The system further includes a plurality of attitude control motors corresponding to the plurality of cavities, such that an attitude control motor of the plurality of attitude control motors is disposed in each cavity of the plurality of cavities. Adjacent attitude control motors share a side wall or a portion of a side wall therebetween and pressurization loads generated by operation of one of the plurality of attitude control motors are transmitted to the monolithic frame.

The present system is particularly useful to provide thruster control to many various types of vehicles, for example, air-traveling vehicles, such as aircraft, missiles, projectiles, rockets, air-traveling munitions, and the like; water-traveling vehicles, such as torpedoes, submarine vehicles, water-traveling munitions, and the like; exoatmospheric vehicles, such as spacecraft, satellites, space-traveling munitions, and the like.

FIG. 1 depicts a perspective view of a first illustrative embodiment of a monolithic attitude control motor system 101. System 101 comprises a monolithic attitude control motor frame 103 housing a plurality of attitude control motors, such as a plurality of attitude control motors 105 and a plurality of attitude control motors 107. Note that only one attitude control motor 105 and one attitude control motor 107 are labeled in FIG. 1 for clarity, although a plurality of attitude control motors 105 and a plurality of attitude control motors 107 exist in the embodiment shown in FIG. 1. It should be noted that, for the purposes of this disclosure, an "attitude control motor" is defined as a propellant-containing device configured to provide thrust but that omits a pressure vessel for containing pressures induced by the operation of the propellant. Monolithic frame 103 acts as a pressure-containment device, as discussed in greater detail herein. Illustrative examples of attitude control motors 105 and 107 include, but are not limited to, a portion of propellant configured to be disposed in a cavity of monolithic frame 103, such as cavities 201 and 203 shown in FIGS. 2 and 3; a portion of propellant disposed in a cup and configured to be disposed in a cavity of monolithic frame 103; a portion of propellant, disposed in a cup or omitting a cup, operably associated with a nozzle and configured to be disposed in a cavity of monolithic frame 103, or the like. It should be noted that the present invention contemplates many different configurations of attitude control motors for use in the present system.

Still referring to the embodiment illustrated in FIG. 1, attitude control motors 105 exhibit generally octagonal shapes proximate an outer surface 109 of monolithic frame 103 and attitude control motors 107 exhibit generally rectangular or square shapes proximate outer surface 107 of monolithic frame 103. It should be noted that outer surface 109 is a surface of revolution about a centerline 111 of monolithic frame 103. As is discussed in greater detail herein, the attitude control motors of the present system 101 exhibit shapes and/or dimensions proximate outer surface 109 of monolithic frame 103 that allow the attitude control motors to be nested together, thus providing an efficient pack of attitude control motors.

Still referring to the embodiment of FIG. 1, the plurality of attitude control motors 105 and the plurality of attitude control motors 107 are disposed generally radially about centerline 111 of monolithic frame 103 such that, when operated, any of the attitude control motors generates a thrust vector away from centerline 111, as indicated, for example, by arrows 113 and 115. As is discussed in greater detail herein, adjacent attitude control motors share common side walls or one or more portions of side walls, such as a side wall 117, thus forming a honeycomb structure that allows pressurization loads generated by the operation of one or more of the plurality of attitude control motors, such as one or more of attitude control motors 105 and/or one or more of attitude control motors 107, to be transmitted to monolithic frame 103. The present invention contemplates any type of attitude control motors for attitude control motors 105 and 107, so long as they are configured to share common side walls or one or more portions of side walls, i.e., attitude control motors 105 and 107 provide generally no individual pressurization containment, as pressurization containment is provided by monolithic frame 103. In certain embodiments monolithic frame 103 defines a central passageway 119 for routing control lines to the plurality of attitude control motors 105 and the plurality of attitude control motors 107, as well as other lines, devices, and the like as desired. It should be noted, however, that the scope of the present invention encompasses embodiments wherein central passageway 119 or the like is omitted, wherein control lines operatively associated with the plurality of attitude control motors 105 and the plurality of attitude control motors 107 are routed by different pathways.

Figure 2:
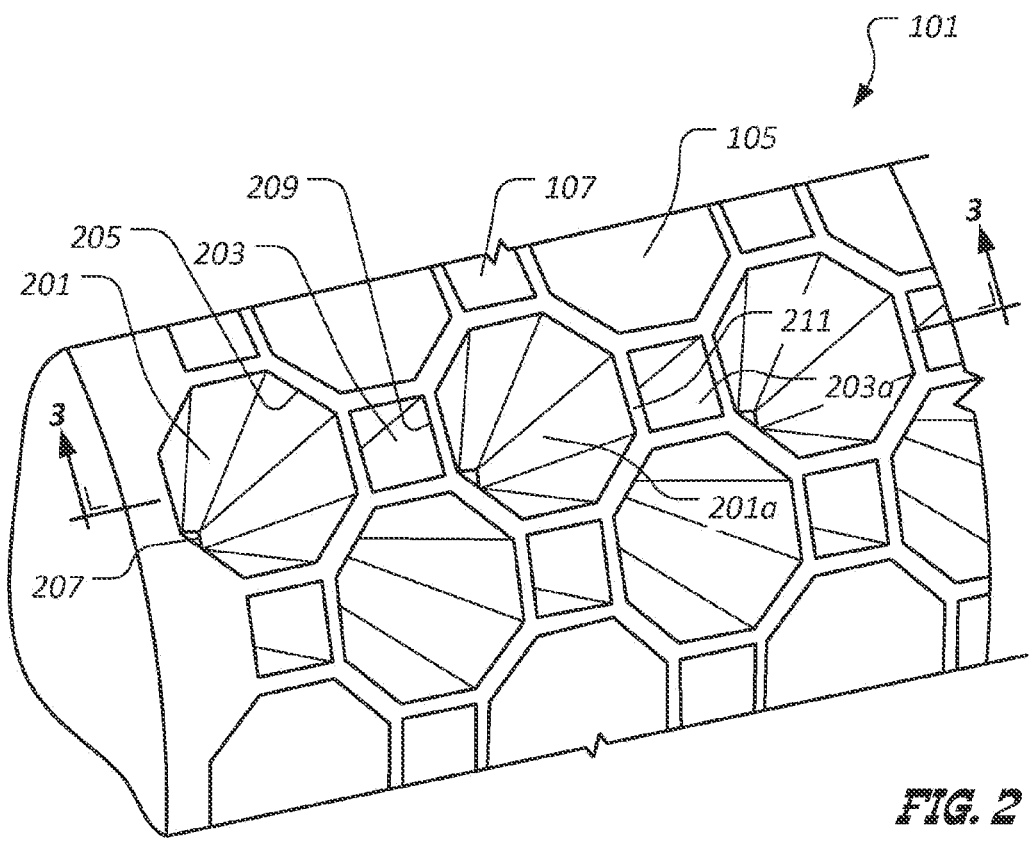
FIG. 2 is an enlarged, perspective view of a portion of the monolithic attitude control motor system of FIG. 1, as indicated in FIG. 1, in which some of the attitude control motors are removed to better reveal particular aspects of a monolithic attitude control motor frame.

FIG. 2 depicts an enlarged, perspective view of a portion of monolithic attitude control motor system 101, as indicated in FIG. 1, in which some of attitude control motors 105 and 107 are removed to better reveal particular aspects of monolithic frame 103. As shown in FIG. 2, monolithic frame 103 defines a plurality of cavities 201 corresponding to the plurality of attitude control motors 105 and defines a plurality of cavities 203 corresponding to the plurality of attitude control motors 107. Note that in FIG. 2 only one cavity 201 and one cavity 203 are labeled for clarity, although monolithic frame 103 defines a cavity 201 in which each attitude control motor 105 is received and defines a cavity 203 in which each attitude control motor 107 is received. In the illustrated embodiment, one or more of cavities 201 transitions and tapers from a generally octagonal shape 205 at outer surface 109 to a generally rectangular or square shape 207 at an inner surface 121 (shown in FIGS. 1 and 3) of monolithic frame 103. Also, in the illustrated embodiment, one or more of cavities 203 transitions and tapers from a generally rectangular or square shape 209 at outer surface 109 to a generally rectangular or square shape 301 (shown in FIG. 3) at inner surface 121 (shown in FIGS. 1 and 3). It should be noted, however, that the shapes and tapers of cavities 201 and 203 shown in FIG. 2 are merely exemplary of the multitude of shapes and tapers of cavities contemplated by the present invention. While FIG. 2 depicts cavities 201 and 203 as having facets, the scope of the present invention is not so limited. Rather, interior surfaces of cavities 201 and 203 are, in certain embodiments, three-dimensional, curved, i.e., non-planar, surfaces rather than faceted surfaces.

Figure 3:
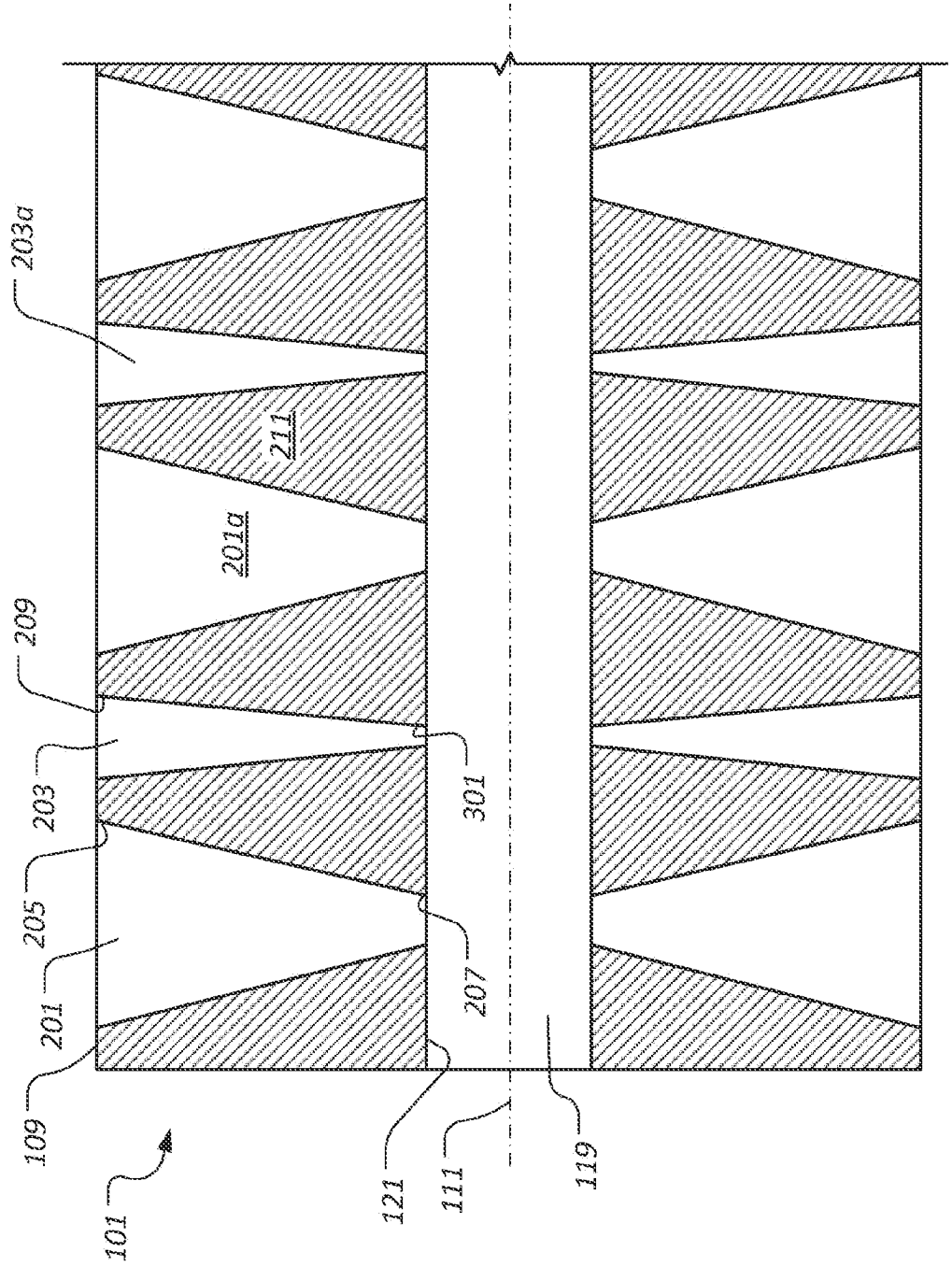
FIG. 3 is a cross-sectional view of a portion of the monolithic attitude control motor frame, taken along the line 3-3 in FIG. 2.

Referring to FIGS. 2 and 3, and as discussed herein concerning FIG. 1, adjacent attitude control motors 105 and 107 share common side walls or one or more portions of side walls, which allows pressurization loads generated by the operation of one of the plurality of attitude control motors, such as one of attitude control motors 105 or one of attitude control motors 107, to be transmitted to monolithic frame 103. Such side walls define the plurality of cavities 201 and 203. For example, a side wall 211 defines a portion of the particular cavity 201 labeled in FIG. 2 as cavity 201a and a portion of the particular cavity 203 labeled in FIG. 2 as cavity 203a. Such side walls or portions of side walls in the aggregate form monolithic or unitary frame 103. Mechanical pressurization loads generated by the operation of one or more of the plurality of attitude control motors, such as one or more of attitude control motors 105 and/or one or more of attitude control motors 107, are transmitted to and resolved by monolithic frame 103.

Figure 4:
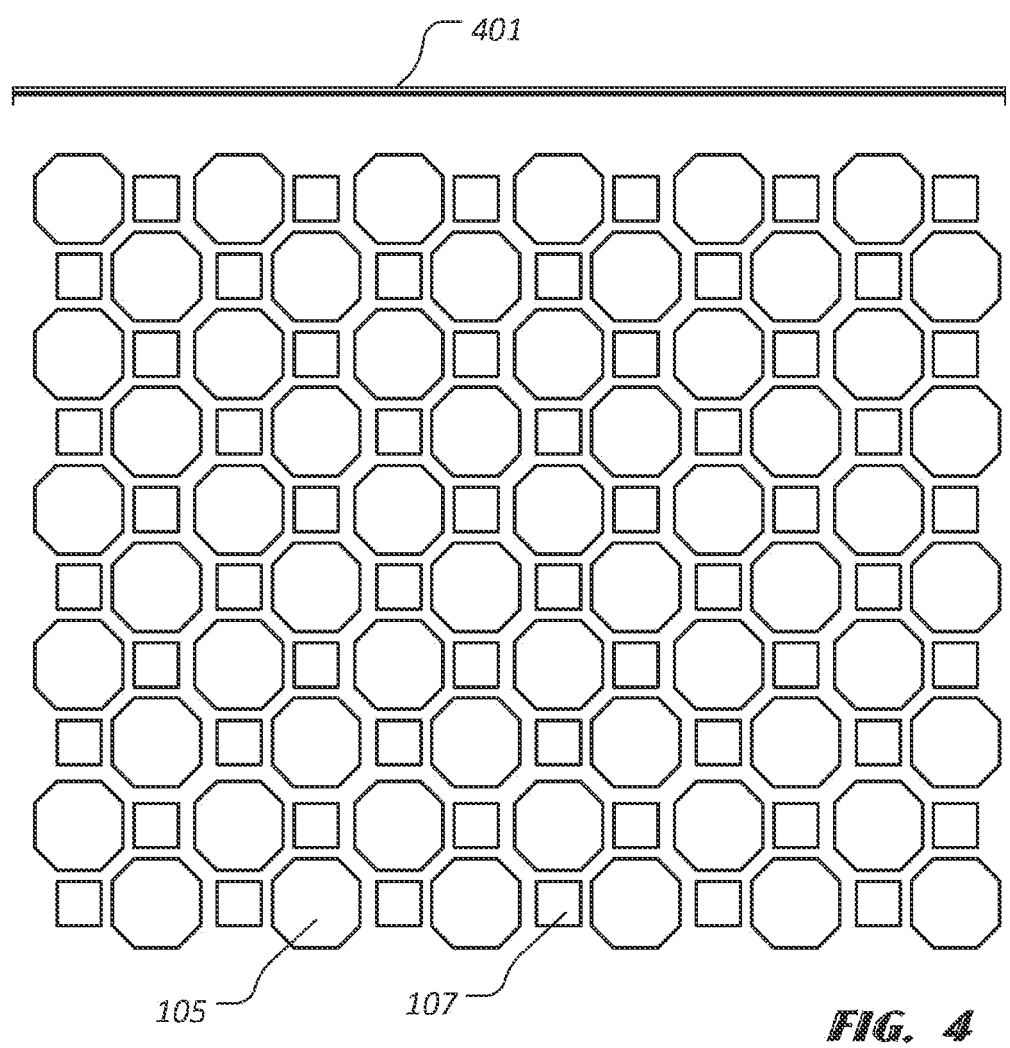
FIG. 4 is a flattened graphical representation of the attitude control motor pattern of the monolithic attitude control motor system of FIG. 1.

The present invention contemplates many different arrangements, shapes, and sizes of attitude control motors in the monolithic attitude control motor system and, thus, contemplates many different arrangements, shapes, and sizes of cavities defined by the monolithic attitude control motor frame. FIG. 4 depicts a flattened graphical representation of the attitude control motor pattern 401 of the monolithic attitude control motor system of FIGS. 1-3. In other words, the representation of FIG. 4 depicts the pattern of the monolithic attitude control motor system of FIGS. 1-3 as the pattern appears when "unrolled" from monolithic attitude control motor system 101 and flattened. As discussed herein, the illustrated pattern includes a plurality of attitude control motors 105 that exhibit generally octagonal shapes at outer surface 109 of monolithic attitude control motor frame 103 and includes a plurality of attitude control motors 107 that exhibit generally rectangular or square shapes at outer surface 109. Thus, the illustrated pattern utilizes two sizes and shapes of attitude control motors in system 101.

Figure 5:
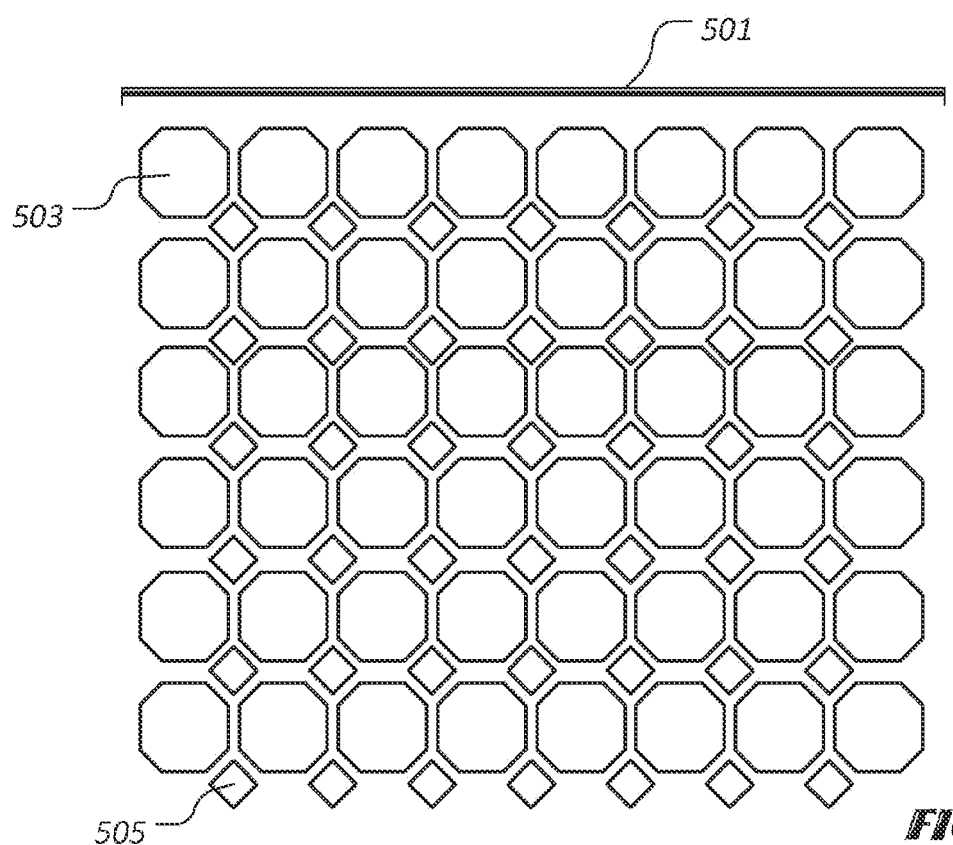
FIGS. 5 and 6 are flattened graphical representations of exemplary attitude control motor patterns alternative to that of FIG. 4.
Figure 6:
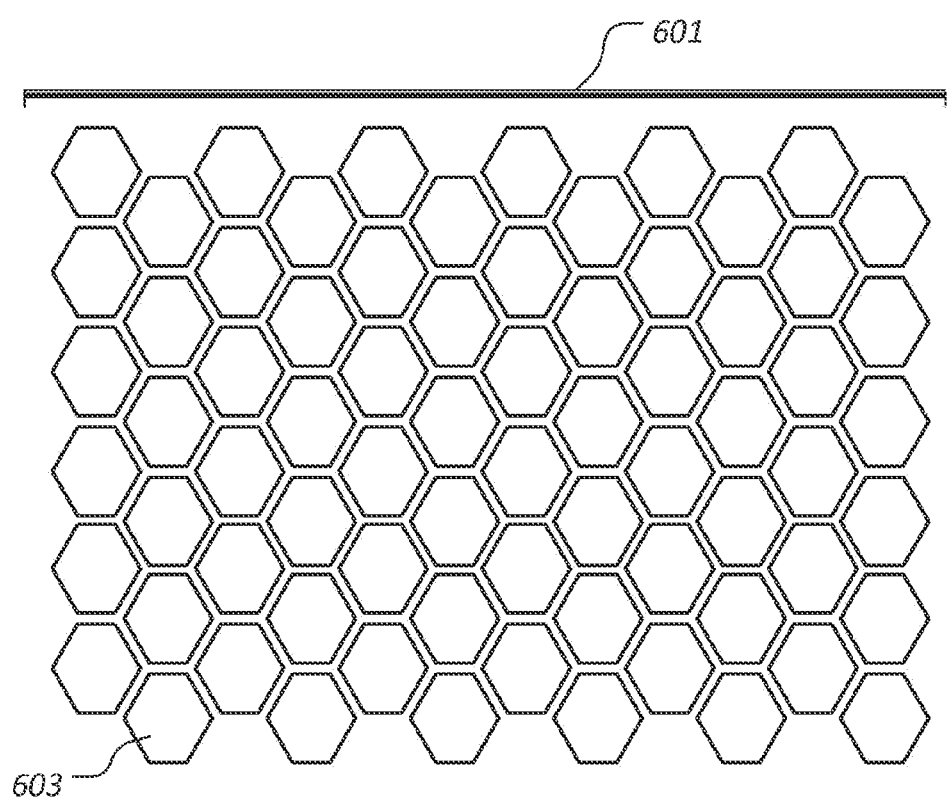

FIGS. 5 and 6 depict flattened graphical representations of exemplary attitude control motor patterns alternative to that shown in FIG. 4. In the embodiment of FIG. 5, a pattern 501 employs two sizes and shapes of attitude control motors 503 and 505, as in the embodiment of FIG. 4. Similarly to the embodiment of FIG. 4, pattern 501 includes a plurality of attitude control motors 503 that exhibit generally octagonal shapes at an outer surface of the monolithic attitude control motor frame (corresponding to outer surface 109 of monolithic attitude control motor frame 103) and includes a plurality of attitude control motors 505 that exhibit generally rectangular or square shapes at the outer surface of the monolithic attitude control motor frame. The arrangement of attitude control motors 503 and 505, however, is different from the arrangement of attitude control motors 105 and 107, shown in FIG. 4. Attitude control motors 503 and 505 are in a nested configuration to provide a high packing efficiency of attitude control motors.

In the embodiment of FIG. 6, a pattern 601 employs a single size and shape for a plurality of attitude control motors 603. In pattern 601, each of the plurality of attitude control motors exhibits a generally hexagonal shape at an outer surface of the monolithic attitude control motor frame (corresponding to outer surface 109 of monolithic attitude control motor frame 103). Attitude control motors 603 are in a nested configuration to provide a high packing efficiency of attitude control motors.

Figures 7, 8:
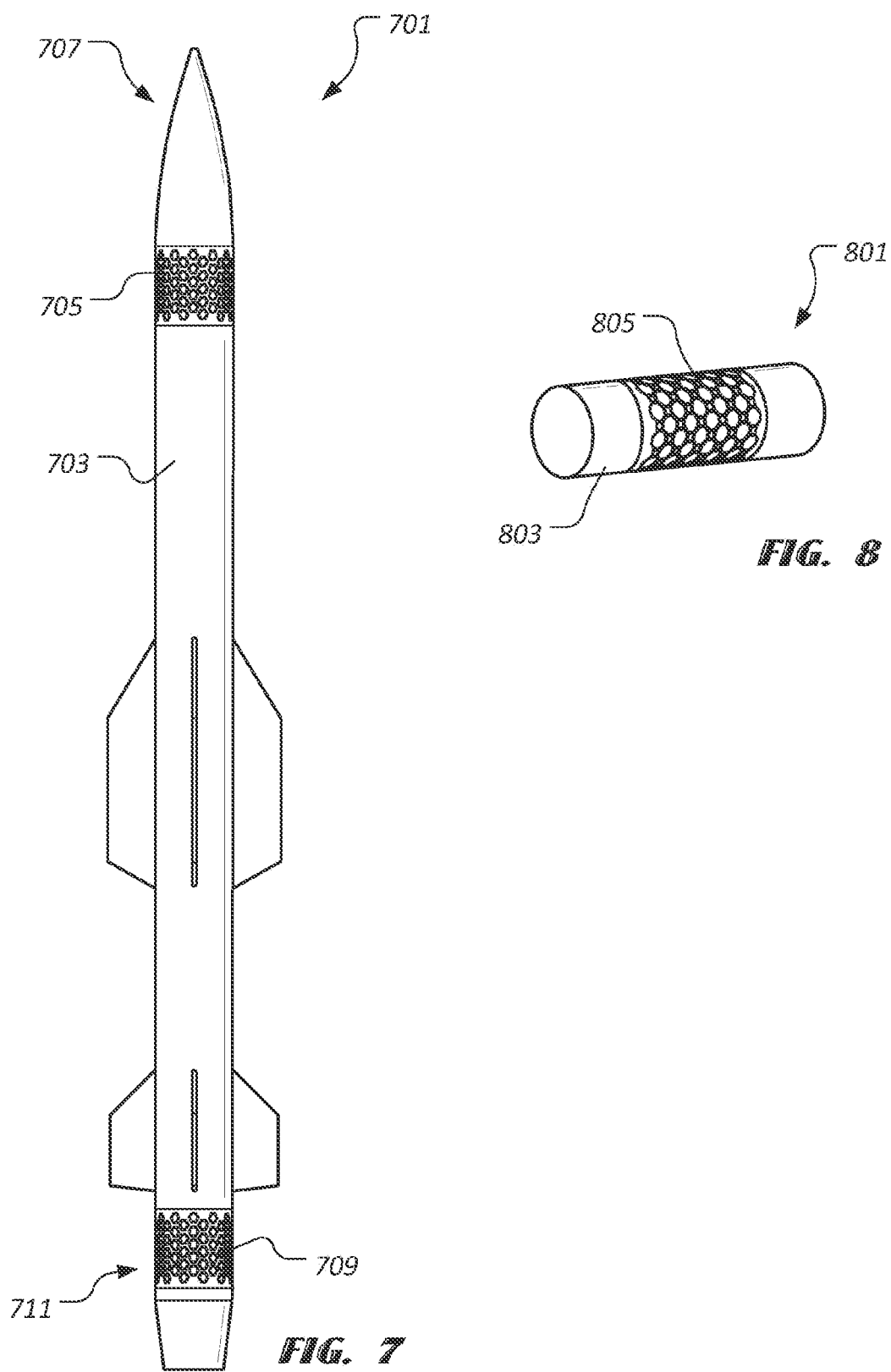
FIG. 7 is an illustrative embodiment of an air-or water-traveling vehicle incorporating the monolithic attitude control system.
FIG. 8 is an illustrative embodiment of an exoatmospheric vehicle incorporating the monolithic attitude control system.

As described herein, the present monolithic attitude control motor system, such as system 101, may be operatively associated with many various types of vehicles for providing vehicle thrust control. FIGS. 7 and 8 provide examples of two types of vehicles that incorporate the present monolithic attitude control motor system. It should be noted, however, that the present invention contemplates many different types of vehicles that employ the present monolithic attitude control motor system. In the embodiment of FIG. 7, an air-or water-traveling vehicle 701 comprises a body 703, which is operatively associated with a first monolithic attitude control motor system 705 disposed proximate a fore end 707 of body 703 and a second monolithic attitude control motor system 709 disposed proximate an aft end 711 of body 703. In the embodiment of FIG. 8, an exoatmospheric vehicle 801 comprises a body 803 operatively associated with a monolithic attitude control motor system 805. In one implementation, monolithic attitude control motor system 805 is disposed proximate a center of mass of exoatmospheric vehicle 801.

The present invention provides significant advantages, including: (1) providing an attitude control motor system that exhibits higher packaging efficiency than conventional attitude control motor systems; (2) providing an attitude control motor system that provides a large amount of total impulse than conventional attitude control motor systems; and (3) providing an attitude control motor system that better resolves pressurization forces during operation of the attitude control motors.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A monolithic attitude control motor system, comprising: a monolithic structure comprising an outer surface of revolution and a plurality of side walls defining a plurality of cavities in a geometric arrangement extending radially from the outer surface of revolution; and a plurality of attitude control motors corresponding to the plurality of cavities, such that an attitude control motor of the plurality of attitude control motors is disposed in each cavity of the plurality of cavities; wherein the plurality of side walls defines a first plurality of cavities exhibiting a first polygon shape at the outer surface of revolution and tapers to form a second polygon shape towards a centerline of the monolithic structure and a second plurality of cavities at the outer surface of revolution, different from the first plurality of cavities, and tapers towards the centerline of the monolithic structure; and wherein adjacent attitude control motors share a side wall or a portion of a side wall therebetween; and wherein pressurization loads generated by operation of one of the plurality of attitude control motors are transmitted to the monolithic structure and wherein:

the first polygon shape is an octagon;

the first and second plurality of cavities are configured in the geometric arrangement at the outer surface of revolution of nested octagons and rectangles; and the second polygon of the first plurality of cavities exhibits one of a square shape or a rectangular shape towards the centerline of the monolithic structure.

2. The monolithic attitude control motor system of claim 1, wherein the monolithic structure defines an inner surface defining a central passageway.

3. The monolithic attitude control motor system of claim 1, wherein the plurality of side walls of the first plurality of cavities includes:

first cavity side walls tapering toward the centerline of the monolithic structure;

second cavity side walls tapering toward the centerline of the monolithic structure;

a respective second cavity side wall, of the second cavity side walls, having a triangle shape between the outer surface of revolution and an inner surface of the monolithic structure; and each first cavity side wall having a trapezoidal shape between the outer surface of revolution and the inner surface of the monolithic structure.

4. The monolithic attitude control motor system of claim 3, wherein the first cavity side walls and the second cavity side walls alternate around each cavity of the first plurality of cavities.

5. A vehicle, comprising: a body; and a monolithic attitude control system operably associated with the body, the monolithic attitude control system comprising: a monolithic structure comprising an outer surface of revolution and a plurality of side walls defining a plurality of cavities in a geometric pattern extending radially from the outer surface of revolution; and a plurality of attitude control motors corresponding to the plurality of cavities, such that an attitude control motor of the plurality of attitude control motors is disposed in each cavity of the plurality of cavities; wherein adjacent attitude control motors share a side wall or a portion of a side wall therebetween; wherein the plurality of side walls defines a first plurality of cavities exhibiting a first polygon shape at the outer surface of revolution and tapers to form a second polygon shape towards a centerline of the monolithic structure and a second plurality of cavities at the outer surface of revolution, different from the first plurality of cavities, and tapers towards the centerline of the monolithic structure; and wherein pressurization loads generated by operation of one of the plurality of attitude control motors are transmitted to the monolithic structure and wherein:

the first polygon shape is an octagon;

the first and second plurality of cavities are configured in the geometric pattern at the outer surface of revolution of nested octagons and rectangles; and the second polygon of the first plurality of cavities exhibits one of a square shape or a rectangular shape towards the centerline of the monolithic structure.

6. The vehicle of claim 5, wherein the monolithic structure defines an inner surface defining a central passageway.

7. The vehicle of claim 5, wherein the plurality of side walls of the first plurality of cavities includes:

first cavity side walls tapering toward the centerline of the monolithic structure;

second cavity side walls tapering toward the centerline of the monolithic structure;

a respective second cavity side wall, of the second cavity side walls, having a triangle shape between the outer surface of revolution and an inner surface of the monolithic structure; and each first cavity side wall having a trapezoidal shape between the outer surface of revolution and the inner surface of the monolithic structure.

8. The monolithic attitude control motor system of claim 7, wherein the first cavity side walls and the second cavity side walls alternate around each cavity of the first plurality of cavities.

9. The vehicle of claim 5, wherein the vehicle is an air-traveling vehicle.

10. The vehicle of claim 5, wherein the vehicle is a water-traveling vehicle.

11. The vehicle of claim 5, wherein the vehicle is an exoatmospheric vehicle.

12. A monolithic attitude control motor frame, comprising: a monolithic structure comprising a centerline, an outer surface of revolution and a plurality of tapering side walls defining a plurality of cavities in a geometric arrangement extending radially from the outer surface of revolution toward the centerline such that adjacent cavities of the plurality of cavities share a side wall or side wall portion therebetween, wherein each cavity being configured to receive an attitude control motor and the plurality of tapering side walls of each cavity of at least some cavities includes:

first cavity side walls tapering toward the centerline of the monolithic structure;

second cavity side walls tapering toward the centerline of the monolithic structure;

a respective second cavity side wall, of the second cavity side walls, having a triangle shape between the outer surface of revolution and an inner surface of the monolithic structure; and each first cavity side wall having a trapezoidal shape between the outer surface of revolution and the inner surface of the monolithic structure.

13. The monolithic attitude control motor frame of claim 12, wherein remaining cavities of the plurality of cavities of the monolithic structure at the outer surface of revolution exhibit one of a square shape or a rectangular shape.

14. The monolithic attitude control motor frame of claim 12, wherein the inner surface defines a central passageway.

15. The monolithic attitude control motor frame of claim 14, wherein the at least some cavities comprise:

at the inner surface, a square or rectangle, wherein each second cavity side wall forms a corner of the square or the rectangle at the inner surface of the at least some cavities.

16. The monolithic attitude control motor frame of claim 12, wherein the first cavity side walls and the second cavity side walls alternate around each cavity of at least some cavities.

17. The monolithic attitude control motor frame of claim 12, wherein each cavity of at least some cavities has an octagon shape at the outer surface of revolution.

* * * * *